Patented Oct. 1, 1929

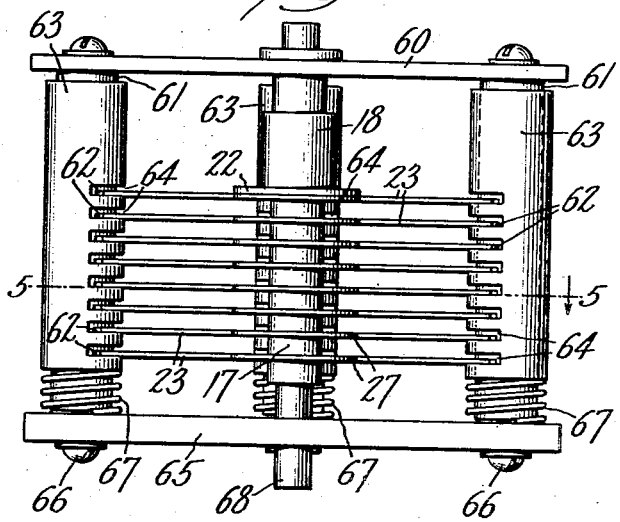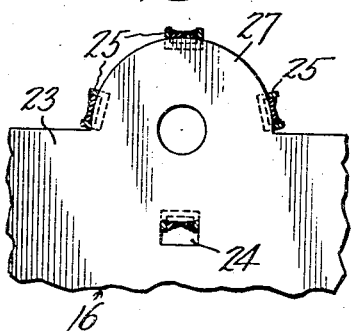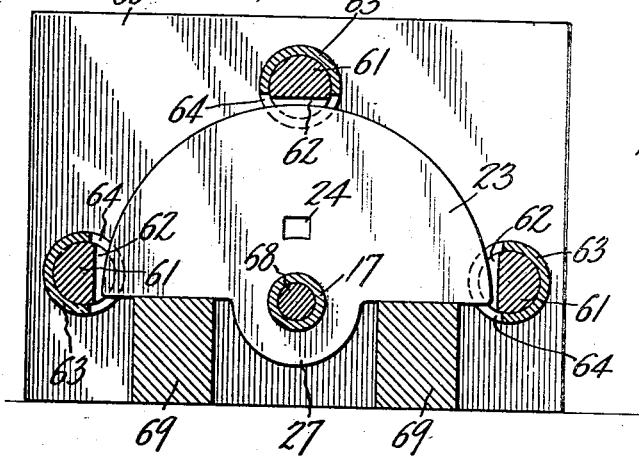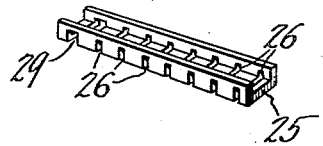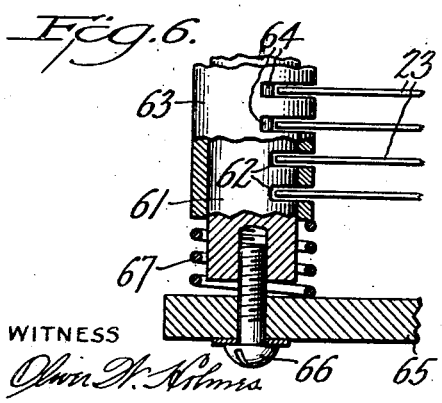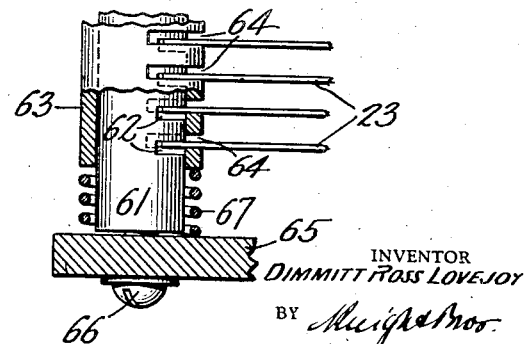
INVENTOR
DIMMITT ROSS LOVEJOY

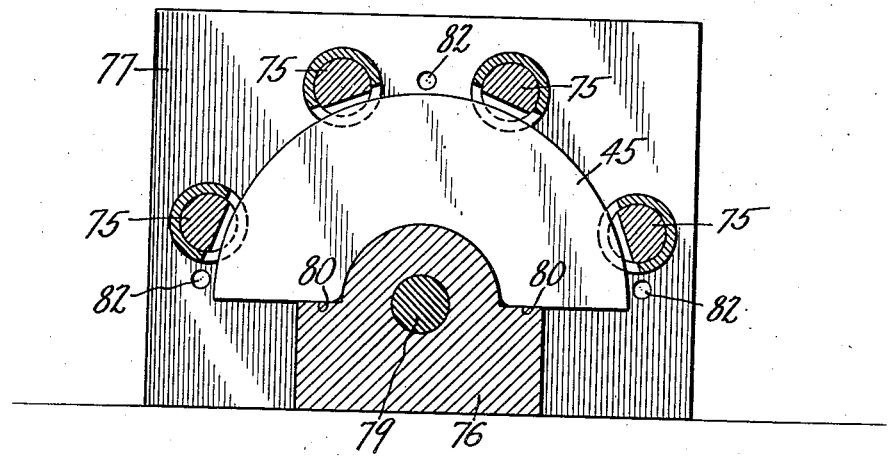
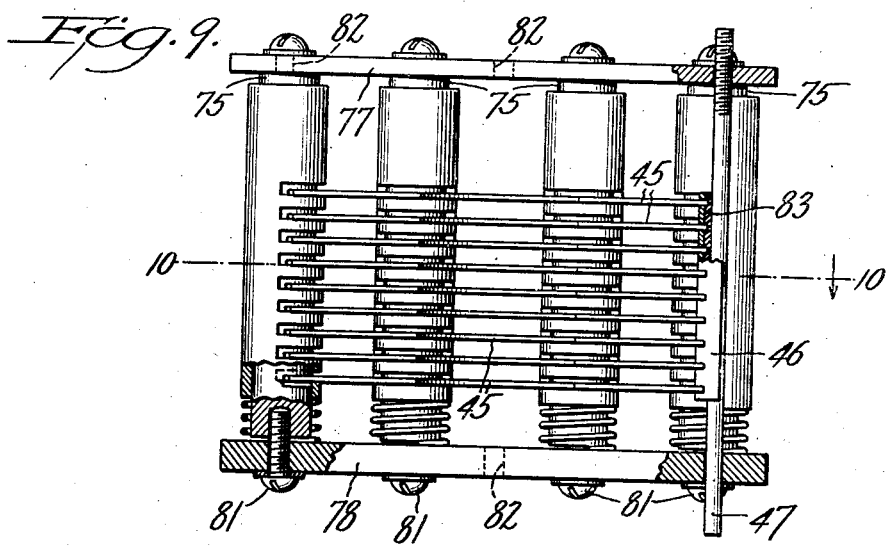
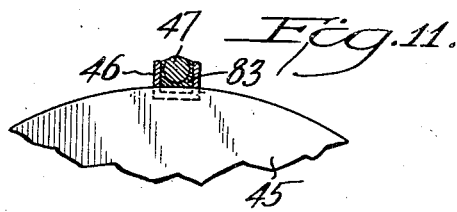

1,729,726

UNITED STATES PATENT OFFICE

DIMMITT ROSS LOVEJOY, OF NEW YORK, N. Y., ASSIGNOR TO LOVEJOY DEVELOPMENT CORPORATION, OF NEW YORK, N. Y., A CORPORATION OF NEW YORK

VARIABLE ROTARY CONDENSER

Application filed July 30, 1927. Serial No. 209,478.

My invention relates to air condensers of the rotary type and the particular novel features comprise the mode of assembling the rotor and stator plates of the condenser such that the rotor and stator each forms a mechanically comparatively rigid structure. The further purpose of the novel manner of assembling is to facilitate the assembling work as well as to secure the correct spacing of the plates relatively to each other during the assembling and to maintain the correct spacing after the structure is finished. Moreover, by this novel manner of assembling, cleaner soldering becomes possible in so far as the solder remains confined to the portions for which it is intended, these portions becoming thoroughly embedded in the solder.

My invention is illustrated in the accompanying drawings in the form of a "free end rotor" condenser, but it will be apparent to those skilled that the novel features of my invention are not confined to this type of variable condenser.

In these drawings:—

Figure 3 represents in larger scale the central portion of the assembled rotor;

Figure 4 represents the bottom view of a jig for assembling and lining up the rotor plates;

Figure 5 represents a vertical section through the jig with the plates on the line 5—5 in Figure 4;

Figures 6 and 7 represent detail views in larger scale and partly in section of one of the three clamping columns of the jig shown in Figures 4 and 5, Figure 6 showing the clamping device in open position and Figure 7 in clamped position;

Figure 8 represents in perspective view one of the spacer bars employed for spacing the rotor and stator plates;

Figure 9 represents a bottom view of the jig containing the assembled stator plates;

Figure 10 represents a vertical section thereof on the line 10—10 in Figure 9, and Figure 11 represents a portion of a stator plate together with the spacer shown in cross section.

Figure 1:
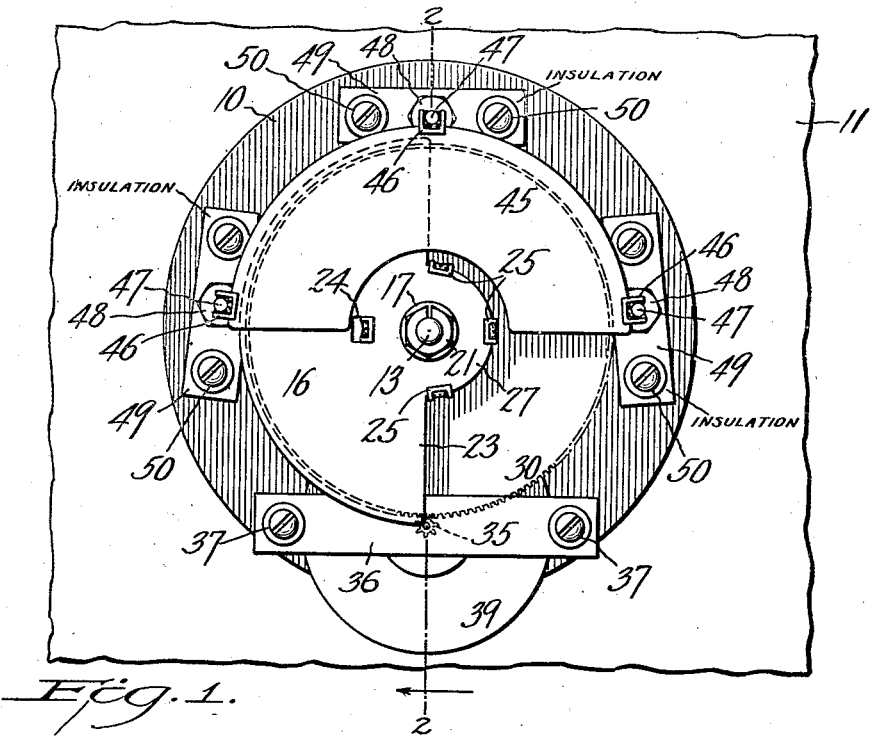
Figure 1 represents the rear view of the assembled condenser mounted on the instrument panel.
Figure 2:
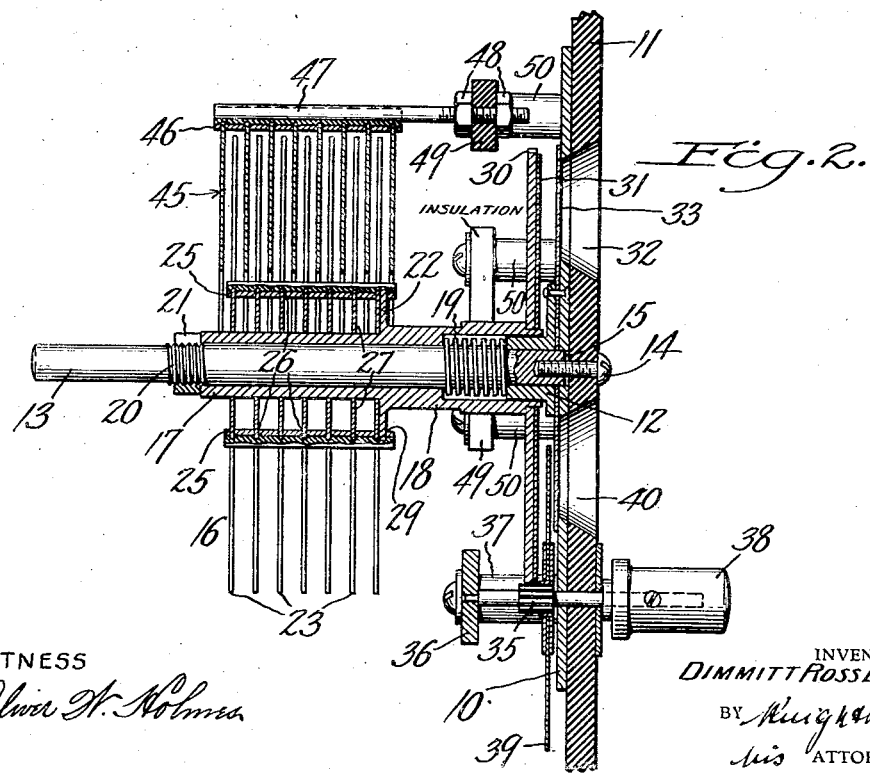
Figure 2 represents a longitudinal vertical section thereof on the line 2—2 in Figure 1.

Referring to Figures 1 and 2, 10 represents the base plate of the condenser on which the entire mechanism is mounted and which is attached, by suitable means, to the instrument panel 11. Plate 10 has attached to its center a hollow stud 12 which serves as a support for an axle 13. It is seated in stud 12 and held therein by means of a screw 14 which passes through the instrument panel 11 so that thereby the entire condenser is held attached to the panel. For this purpose, axle 13 is shouldered near the outer end of stud 12 so that sufficient draw is left, as is shown at 15, to hold the axle in the stud and to hold the condenser against the panel.

Axle 13 serves as a support for the rotor 16 of the condenser, the rotor plates being mounted, as will be described presently on a common hub 17. Hub 17 is enlarged at its inner end towards base plate 10, as is shown at 18, and it extends partway over stud 12. In the hollow space within this enlarged portion is disposed a spring 19 which bears at one end against the outer end of stud 12 and at the other end against the bottom of the recess in the enlarged hub portion 18, thereby tending to push the hub away from the stud. Near the free end of axle 13 is provided a screw thread 20 on to which a split nut 21 is threaded which bears against the outer end of hub 17 and thereby takes up the pressure of spring 19. In this manner the hub may be longitudinally shifted on axle 13 within certain limits for the purpose of properly adjusting the rotor plates within the stator plates to be described presently.

The outer end of enlarged hub portion 18 is provided with a flange 22. The rotor plates 23 have a shape which more clearly appears from Figure 5. They are semi-circular but have a completely circular central portion and a central hole of the size of hub 17. They are further provided with a substantially square inner hole 24 about on line with the peripheral circle of the disc hub for the purpose of accommodating the spacing elements which will now be described.

The rotor plates are held together in relatively spaced position by spacing elements 25 of which one is shown in detail in Figure 8. Such a spacing element has the form of a channel bar provided with as many slots 26 at the bottom as there are rotor plates, and four of these spacers are employed as is shown in Figure 3 for holding the rotor plates together. Three of these spacing bars, which are termed the outer bars, are distributed around the hub 27 of the rotor plates, one plate being disposed in each slot, and the fourth spacer, which is termed the inner bar, is disposed in the square hole 24 previously mentioned. By these means the rotor plates are supported around their center of rotation and quite a distance away from it, at four points which has the effect of a hub of comparatively large diameter, and imparts great rigidity to the rotor as a whole and to the individual plates as well in particular to those plate portions which intermesh with the stator plates. It will be noted from Figures 3 and 8 that the slots 26 are milled through the bottom of the channel bar so that when the spacer is placed on the rims of the rotor plates the latter protrude through the bottom into the channel portion of the bar so that when this channel is filled with solder, the solder will flow completely around the rim of the plates without oozing through the bottom of the channel and without running over the plates themselves. In this manner a substantial amount of solder can be employed to hold the structure together as will appear from Figure 3. From Figure 8 it will be noted that the slot 29 at one end of each bar 25 is wider than the remaining slots. This slot receives, as appears from Figure 2, also the flange 22 of enlarged hub portion 18 previously mentioned, together with the last rotor plate, so that when the soldering is finished the plates are thereby attached to the hub.

The inner end of hub portion 18 carries a large gear wheel 30 on which a dial 31 is mounted, which latter can be observed through the window 32 provided in the instrument panel 11 and in base plate 10, a piece of transparent material, such as for instance clear celluloid 33, being placed over the inside of the window in base plate 10. This window material might be held to the plate through the stud 12 as shown.

Gear wheel 30, and thereby the entire rotor 16 is driven through a pinion 35 having its shaft mounted at one end in a bridge 36 held by two studs 37 which are fixed on plate 10, the pinion shaft being journalled at its other end in base plate 10 through which it protrudes to the outside of panel 11 where an operating knob 38 is fixed to the pinion shaft. To the pinion shaft is further fixed a small dial 39, which can be observed through a second window 40 also provided in base plate 10 and in panel 11, on which graduations may be marked as submultiples of the graduations marked on the main dial, corresponding to the gear-ring ratio between the pinion 35 and gear wheel 30.

The stator plates are held together and spaced apart by spacing bars 46 similar to those shown at 25 in Figure 8. The stator 45 appears in Figures 1 and 2 and it will be noted that three spacing bars 46 are uniformly distributed over its circumference so that the stator plates are thereby securely held in place relatively to each other after the channels of the bars are filled with solder. For the purpose of fastening the stator to the base plate 10, I make the channel of the bars 46 for the stator somewhat deeper than the channel of the bars 25 employed for the rotor so that this deeper channel will accommodate a supporting rod 47 which is soldered into the channel together with the soldering of the stator plates. The location of these supporting bars 47 in their respective channel bars clearly appears from Figures 1 and 2. These rods 47 are flush with the outer ends of the spacing bars (see left hand end in Figure 2) and they extend beyond the inner ends of the spacing bars and are threaded at these extensions so that they can be attached individually by nuts 48 or similar means to individual insulating bridges 49 which are mounted on studs 50 fixed on base plate 10. By means of these nuts the stator can be lined up relatively to the rotor so that the stator plates are set exactly in parallel to the rotor plates. By these means the stator can also be roughly adjusted in the direction of the rotor axis so that each rotor plate stands approximately in the middle between two adjacent stator plates, whereas the exact alinement as to distance between the stator and rotor plates is accomplished by shifting hub 17 of the rotor on its axle 13 by adjusting split nut 21. For certain purposes it may be desired not to have the rotor plates exactly in the middle between two adjacent stator plates. For instance, it is obvious that when the rotor is turned entirely into the stator the capacity of the condenser in that position may be increased by adjusting the plates of the rotor closer to one of the adjacent stator plates, for instance to the right in Figure 2. When the condenser is operated with the stator plates so adjusted the total range of the condenser between rotor "in" and "out" becomes greater than in case the rotor plates are adjusted exactly in the middle between two adjacent stator plates, when the maximum capacity of the condenser and thus its range becomes smaller.

The rotor and stator, thus constituted, may be assembled from its individual plates conveniently in the following manner: Referring first to the rotor assembly the jig which is provided for this purpose and which is shown in Figures 4 to 7 is constructed as follows. As shown in Figures 4 and 5 an end plate 60 is provided with three studs 61 spaced apart as shown in Figure 5 and permanently fixed to plate 60. Studs 61 are provided with transverse slots 62 which are spaced apart the distance at which the rotor plates are to be spaced apart from each other, but these slots are considerably wider than the thickness of the rotor plates. Each of studs 61 carries a sleeve 63 slidingly disposed thereon and provided with similar slots 64 spaced apart the same distance as slots 62 and of the same width as the latter, so that when the slots of these two elements register (as is shown for instance in Figure 6) ample space is provided to insert the rotor plates 23 into the open slots.

To the free ends of studs 61 is attached an end plate 65 by means of screws 66 and between each sleeve 63 and end plate 65 is disposed on each stud a spring 67. So long as the screws 66 are loosened as shown in Figure 6, springs 67 are not under tension and the slots of each stud register with the slots of its pertaining sleeve 63 so that the rotor plates 23 can be inserted into the slots of the three studs. All of the plates 23 are lined up on a common center by means of the hub 17 on which they are mounted as previously described and through this hub is passed a temporary arbor 68 which passes through the two end plates 60 and 65 of the jig, thereby fixing the rotor center relatively to the jig. The semi-circular plates 23 are lined up circumferentially by means of two blocks 69 which rest on the base on which the jig is placed (see Figure 5). This will line up all holes 24 in the plates. Thereafter the jig screws 66 are tightened so that jig plate 65 is drawn toward studs 61 whereby springs 67 are compressed and in turn bear against their respective sleeve 63 so that now the individual rotor plates 23 are clamped by the sleeves against the slot walls of the studs. This is shown in detail in Figure 7, and the general view of the jig in clamped position is shown in Figure 4. Now the spacing bars 25 can be attached to the rotor plates at the places indicated in Figure 3 and the rotor is now in a position for flowing solder into the channels of bars 25. Thereafter the rotor can be removed from the jig and is completed so far as its assembly is concerned.

The jig for assembling and soldering the stator plates is similarly constructed so far as the clamping mechanism employed is concerned, except that I prefer to use four clamping studs 75 in order to properly space the rims of the stator plates as closely as possible to the points at which they are joined together by the spacing bars. The stator plates are first inserted into the slots when the jig is open, whereafter they are lined up by means of an alinement block 76 which lines up the inner semi-circular portion of the plates on a common center. For this purpose the block is fixed relatively to the two end plates 77 and 78 of the jig by means of an arbor 79 (not shown in Figure 9). Alinement block 76 is also provided with two straight surfaces 80 both located in the same diametrical plane for the purpose of lining up the plates 45 circumferentially. After this has been done the jig screws 81 are tightened and thereafter the spacing bars 46 of the stator are attached at three points of the stator circumference appearing in Figure 1. Thereafter supporting rods 47 are passed through the channels of the spacing bars, for which purpose holes 82 are provided in the two end plates of the jig. Now the jig is ready for flowing solder into the channels of the spacers by which simultaneously the rod 47 in each channel is attached to the stator as is shown in Figure 11 which illustrates the channel of bar 46 filled with solder 83 and supporting rod 47 embedded therein. By these means supporting rods 47 are at the same time very exactly lined up in parallel to each other and in parallel relation to the central axis of the stator. The finished stator can now be removed from the jig and rods 47 can be sawed off at their unthreaded ends flush with the ends of spacing bars 46.

The particular novel features of my improved jig and its great advantages over the jigs of the prior art for similar purposes are that cumulative errors in assembling, due to the nonuniformity in thickness of the stock from which the plates are punched, are avoided.

It is well known that the thickness of sheet punching varies considerably according to whether the portion measured was part of the edge or part of the inner portion of the stock. For instance when in a group of condenser plates all right hand corners happen to have been part of the outer portion of the stock and all left hand corners happen to have been part of the inner portion of the stock, such plates, when assembled by interposition of ordinary spacing rings or plates in jigs or the like, as practiced heretofore, will not constitute a parallel-plate rotor or stator element, since the error in thickness of the preceding plate is added at the same side to the error of the succeeding plate. In my present improved clamping jig this accumulation of inaccuracies is avoided, since all plates are lined up against the same, corresponding sides of the fixed slots in the studs, which have uniform spacing, by moving the follower sleeves all in one direction.

In other words my improved jig represents a multiple jaw vise with definitely spaced fixed jaws, against which the respective plate portions, located in the jaws, are forced by movable jaws. At the same time provisions are made, as described, whereby the jaws can be opened sufficiently wide to permit the convenient insertion of the plates into the jig.

It is obvious to anyone skilled in this art that the jig plates which are here described and shown as fastened and tightened by a number of individual screws to the studs, may be attached thereto by any other suitable means, which will afford any quick dissembling and re-assembling of the jig, such detail features forming no part of my invention.

I claim:—

1. In a variable condenser a multi-plate rotor having its plates provided with a hub portion, outer plate spacing elements attached to the outer rim of said hub portion, each plate having at least one perforation located in the inner plate portion in alinement with similar perforations in the other plates and a common inner spacing element attached to one of the edges of said alined perforations to maintain the spacing of the plates at a point substantially opposite from where their hub portion is located.

2. In a variable condenser a multi-plate rotor having its plates provided with a hub portion, outer plate spacing elements attached to the outer rim of said hub portion, each plate having at least one perforation located in the inner plate portion in alinement with similar perforations in the other plates and a common inner spacing element attached to one of the edges of said alined perforations to maintain the spacing of the plates at a point substantially opposite from where their hub portion is located, said spacers consisting each of a channel bar provided with spaced slots extending through the channel bottom to receive the plate edges, said edges protruding into the channels of the bars, the channels containing a flow of solder which unites said protruding plate edges with the bar.

DIMMITT ROSS LOVEJOY.